Dec. 20, 1960 H. G. SCHIRMER ET AL 2,965,101
ABSORBENT PRODUCT
Filed Feb. 11, 1958 2 Sheets-Sheet 1
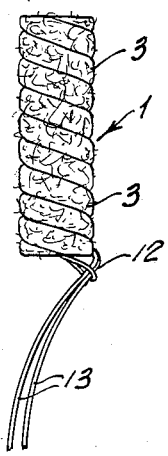
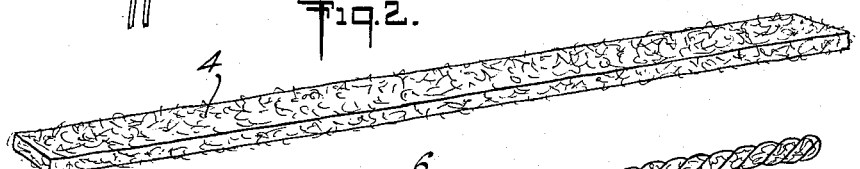
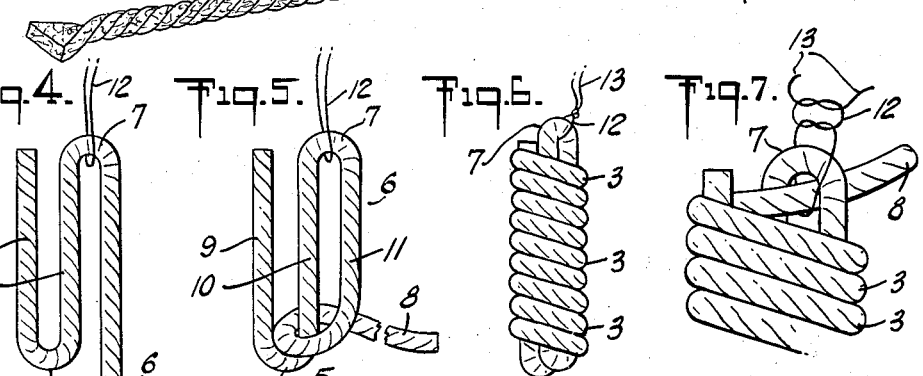
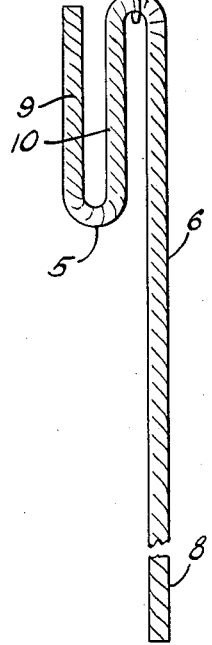
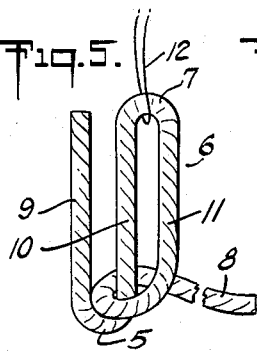
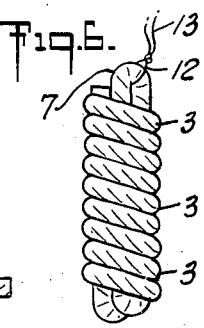
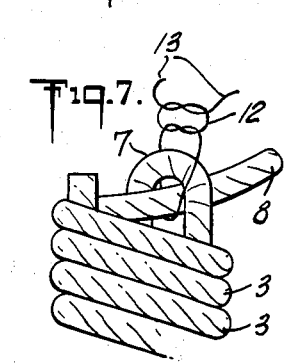
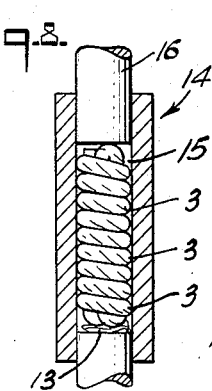
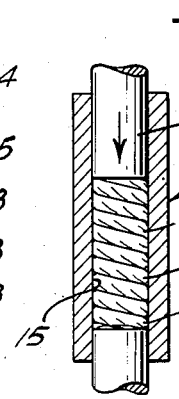
INVENTORS
HENRY G. SCHIRMER
MARY H. MC GUIRE
BY
ATTORNEY Dec. 20, 1960   H. G. SCHIRMER ET AL   2,965,101
ABSORBENT PRODUCT Filed Feb. 11, 1958   2 Sheets-Sheet 2

INVENTORS:
HENRY G. SCHIRMER
MARY H. MC GUIRE
BY
ATTORNEY

United States Patent Office 2,965,101
Patented Dec. 20, 1960

2,965,101
ABSORBENT PRODUCT

Henry G. Schirmer and Mary H. McGuire, New Brunswick, N.J., assignors to Personal Products Corporation, a corporation of New Jersey Filed Feb. 11, 1958, Ser. No. 714,546

11 Claims. (Cl. 128—285)

This invention relates to tampons and more particularly to catamenial tampons which bend upon insertion into the vagina to provide an effective barrier to the flow of menstrual fluid.

Conventional tampons of the highly compressed type generally range from about seven-sixteenths to five-eighths of an inch in diameter, from one and one half to about two inches in length and weigh from about twenty to about sixty grains, the lower weights being used in the smaller tampon sizes and the higher weights in the larger tampon sizes. Most highly compressed tampons used weigh about thirty grains or have an absorbent capacity at least equivalent to about thirty grains of absorbent cotton. The tampons are usually sold in three sizes, junior, regular, and super.

The vaginal cavity wherein such tampons are positioned in use is considerably larger than the tampons. As a result, the tampons often lie to one side of the cavity rather than centrally therein, and menstrual fluid often bypasses the tampon, particularly directly after the tampon is inserted.

The leakage which occurs when conventional highly compressed tampons are used has been substantially reduced and a more effective barrier to the flow of menstrual fluid obtained by providing highly compressed tampons which have a certain degree of flexibility so that the tampons will bend upon being introduced into the vagina to provide a barrier across the vagina. Under normal conditions, the walls of the vagina are collapsed. Also, the walls offer some frictional resistance to the insertion of a tampon. These two factors will cause a tampon which is sufficiently flexible to bend as it is inserted. The degree of flexibility necessary to obtain bending of such tampons upon insertion into the vagina has been defined by measurement on a testing device known as a Gurley R.D. stiffness tester. A tampon having sufficient flexibility to function in this manner will give a "Gurley stiffness reading" below 2.8 when its stiffness is measured on a Gurley stiffness tester as described on page 43 of the December 20, 1934, issue of the Paper Trade Journal. Stiffness is measured with the device bearing a pointer load of two hundred grams spaced four inches below the center. The clamp is placed with its lower edge one inch from the edge of the pointer in the vertical part of the arm. The tampon whose flexibility is to be determined is positioned in the clamp with one and one quarter inches of its length extending beyond the lower edge of the clamp. Tampons having sufficient flexibility to give a "Gurley stiffness reading" below 2.8 when tested in the manner described above will bend upon insertion into the vagina.

Highly compressed tampons heretofore devised having the desired flexibility include tampons which are formed by helically winding a strip of absorbent material and then compressing the helically wound strip to a tampon of conventional size. These tampons operate effectively and bend upon insertion into the vagina. However, tampons of this form tend to lengthen upon withdrawal due to their helical construction. Also, some of the fluid absorbed by the tampon may be squeezed out as uncurling takes place, thus reducing the effectiveness of the tampon.

It is an object of this invention to provide a tampon of the helically wound type which has sufficient flexibility to bend upon insertion into the vagina. It is another object of this invention to provide a flexible tampon which has a limited elongation upon withdrawal after use. It is a further object of invention to provide a tampon which has increased fluid retentivity, particularly upon withdrawal. It is another object of this invention to provide a tampon which has form stability. Other and further objects will become apparent below.

Reference is made to the accompanying drawings and the following specification wherein various illustrative embodiments of the invention are disclosed and described by way of example.

In the drawings:

Fig. 1 is a side view of a tampon embodying the present invention;

Fig. 2 is a perspective view of a strip of absorbent material from which the tampon may be made;

Fig. 3 is a view of the strip of Fig. 2 twisted along its length;

Fig. 4 is a view of the twisted strip of Fig. 3 illustrating the early stages of forming the tampon;

Fig. 5 is a view of an intermediate stage of forming the tampon;

Fig. 6 is a view of the strip form prior to compression;

Fig. 7 is a view of the top portion of Fig. 6 on an enlarged scale illustrating the formation of that portion and a method of securing a withdrawal cord;

Fig. 8 is a view of the strip of Fig. 6 on a slightly reduced scale positioned in a compression device wherein it is compressed;

Fig. 9 is a view of the strip compressed in the device;

Figure 10:
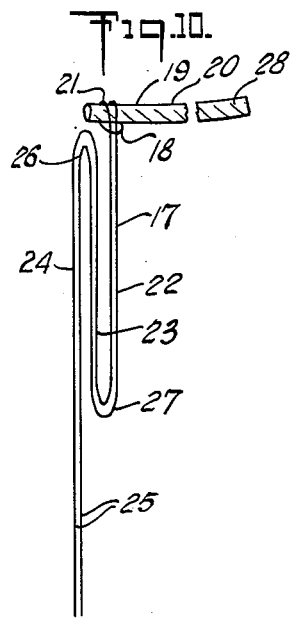
Fig. 10 is a view illustrating the early stages of another way of forming the tampon from a cord and an elongated strip of absorbent material.

In Fig. 1 of the drawings, there is shown a highly compressed, flexible tampon 1 containing absorbent material arranged to permit the tampon to bend upon insertion into the vagina. When the tampon is introduced into the vagina, the resistance encountered during introduction due to the normal wall collapse of the vaginal walls and to the friction of the walls causes the tampon to bend across the vagina to form a barrier to the flow of menstrual fluid.

The tampon may be made flexible by arranging the absorbent material in the form of an elongated coil or helix. Adjacent parts or coils 3 of the helix are free to move with respect to each other, thus imparting flexibility to the tampon. Elongation of the tampon, which would ordinarily result when the tampon is withdrawn from the vagina after use is restricted, as will be more fully explained below.

The tampon may be formed from a strip 4 of absorbent material, such as a strip of carded cotton formed as a sliver approximately one inch in diameter, eighteen inches long, and weighing about forty grains. The strip may, if desired, be twisted lengthwise in either an S or Z direction approximately five to seven turns per inch, as shown in Fig. 3. A single reverse fold 5 is then made in the twisted strip 6 approximately two inches from one end. At a point four inches from the same end the strip is again reversely folded as at 7, to form a generally S type structure at one end of the strip. The opposite end 8 of the strip is then passed through the loop formed by the first fold 5 and pulled through the loop until there is formed three approximately equal lengths 9, 10, 11 longitudinally aligned with each other. The three longitudinally aligned lengths of the strip form a core around which the remainder of the strip is wound, beginning at the part of the core at the first fold 5. The portion of the strip not used to form the core is wound tightly around the three equal lengths of the strip forming the core in a spiral or helical fashion from one end to the other and the winding continued until the remainder of the strip has been wound around the core. When the opposite end of the core is reached, end 8 of the strip is passed through the loop formed by the second fold 7. The part of the strip forming the loop at 7 and the end portion of the strip passed through the loop may then be tied together with a string 12, as illustrated in Fig. 7, having free extending ends which serve as means for withdrawing the tampon after use.

The helically wound strip of absorbent fibers formed in the manner illustrated in Fig. 6 is then placed into a compression device 14 consisting of a cylinder 15 having an interior diameter slightly smaller than the desired diameter in the finished tampon, and a piston 16 for compressing the strip. The strip formed in the manner described above may, by way of example, be placed in a cylinder having a diameter of 0.57 inch. The piston is then operated to compress the helically wound strip mainly in its longitudinal direction to a length of about one inch and the compression maintained for a period of about fifteen seconds. The compressed strip is then removed from the compression device. Due to the nature of the materials used and to its construction, the tampon so formed will tend to expand to some extent, particularly lengthwise, upon removal from the compression device and then become stable in size.

The tampon is removed after use by pulling upon the free ends 13 of the withdrawal cord. Elongation of the tampon upon withdrawal from the vagina is minimized by the formation of the core portion of the tampon as explained above and further by the method of looping and helically winding the strip. The tampon does not elongate appreciably because the forces exerted upon the tampon upon withdrawal are transmitted to the core portion of the tampon instead of the helically wound portion.

The flexibility of the completed tampon may be suitably varied by varying the twist imparted to the strip 4 prior to folding and winding helically, by varying the number of turns in winding the strip, by varying the lengths formed by folding the strip, and the like. Generally speaking, satisfactory tampons of conventional sizes may be obtained using strips from about twenty to about sixty grains in weight, by making the strip sufficiently long to provide the core portion of the tampon plus sufficient additional length to form about nine turns in the helically wound portion of the tampon. The sections 9, 10 and 11 formed by reversely folding one end portion of the strip prior to winding helically are preferably slightly longer than the desired length of the finished tampon. For example, if it is desired to provide a tampon two inches long, the end portion of the strip is so folded that the sections formed by the fold are approximately two and one-half inches long. As a result, when the strip so formed is compressed to a tampon of final size, there will be lengthwise compression of the strip. While it is preferred that the tampon be formed from a strip of carded cotton fibers, other fibers, natural or synthetic, of various dimensions and lengths, including continuous filaments, alone or in combination, may be used to make the tampon.

Figure 11:
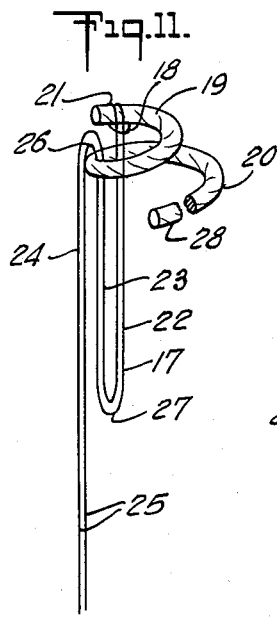
Fig. 11 is a view of a further stage of formation.
Figure 12:
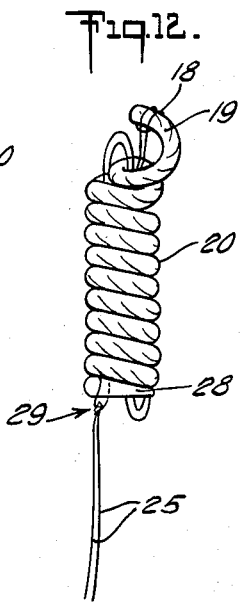
Fig. 12 is a view of the stage of formation prior to compression in a compression device.

In Figs. 10 through 12, there is shown another embodiment of the invention. In this form, a cotton cord or string 17, of the type customarily used as a withdrawal string, approximately eighteen inches long is folded in half. The folded end 18 is attached to one end 19 of a strip 20 of absorbent carded cotton fibers eighteen inches long, one inch wide and weighing about thirty-five grains. Any suitable knot 21 may be used. The absorbent fibrous strip 20 may be twisted in an S or Z twist five to seven twists per inch. The portion of the doubled cord adjacent the end 18 attached to the absorbent strip 20 is then reversely folded twice to form three segments 22, 23 and 24, which are approximately two inches long, to form the core around which the absorbent strip is wound helically. The remaining part of the cord, which extends beyond the end of the finished tampon, provides ends 25 for withdrawing the tampon after use.

With the absorbent strip and the cord associated in the foregoing manner, the end 28 of the absorbent strip 20 opposite end 19 is passed through the loop 26 in the cord. The strip is pulled through loop 26 and is wound helically around the core formed by the three segments 22, 23 and 24 to the end 27 of the core. The ends of the cord forming withdrawing ends 25 are secured to end 28 of the strip in any suitable manner, as for example, by a simple knot 29. The tampon is then placed into a compression device and compressed to form.

In this form of the invention, the withdrawal cord forms the core of the tampon and also provides ends for withdrawing the tampon after use. The forces imposed upon the ends of the withdrawal cord during withdrawal are transmitted to the core formed by segments 22, 23 and 24, and elongation of the tampon is minimized.

Figure 13:
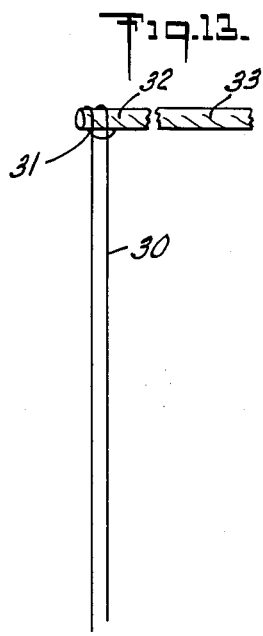
Fig. 13 is a view of the early stages of still another way of forming a tampon of the invention from a cord and an absorbent strip of material.
Figure 14:
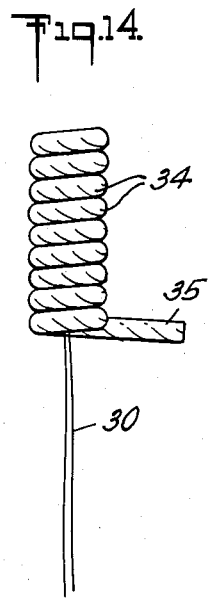
Fig. 14 is a view of an intermediate stage of formation.
Figure 15:
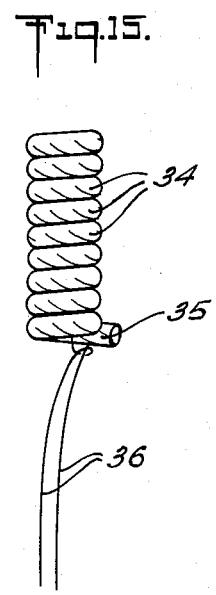
Fig. 15 is a view of the stage of formation prior to compression to form the tampon.

In Figs 13 through 15 there is illustrated still another form of the invention wherein the withdrawal cord also serves as a core. In this form, the withdrawal cord is not reversely folded upon itself to form the core. Instead, the core consists of a portion of the doubled strand of the withdrawal cord. To form this embodiment, a withdrawal cord 30 approximately ten inches long is folded upon itself and the doubled end 31 is attached to one end 32 of an elongated strip 33 of absorbent material. The remainder of the strip is then wound helically around the core in the usual manner to form coils 34. With the absorbent strip completely wound around the core, the portion of the cord extending beyond is tied to the end 35 of the absorbent strip. The remaining portion of the withdrawal cord extends beyond the end of the helically wound strip to provide ends 36 for withdrawing the tampon after use. The construction so formed is then placed into the compression device and compressed to form the tampon, as described above.

It is apparent that numerous modifications and variations may be made in the foregoing illustrative examples of the invention as described without departing from its spirit.

What is claimed is:

1. A tampon comprising a strip of absorbent material highly compressed into an oblong, cylindrical shape, said tampon having a core portion extending longitudinally through said tampon, a helically wound portion wound around said core portion, said tampon being relatively non-extensible lengthwise, said tampon having sufficient flexibility to give a "Gurley stiffness reading" below 2.8.

2. A tampon comprising a strip of absorbent material highly compressed into an oblong, cylindrical shape, a portion of siad strip forming a core extending longitudinally through said tampon, another portion of said strip being helically wound around said core portion, said tampon being relatively non-extensible lengthwise, said tampon having sufficient flexibility to give a "Gurley stiffness reading" below 2.8.

3. A tampon comprising a strip of absorbent material highly compressed into an oblong, cylindrical shape, a portion of said strip forming a core extending longitudinally through said tampon, another portion of said strip being helically wound around said core portion, said tampon being relatively non-extensible lengthwise, means for withdrawing said tampon attached to said core portion, said tampon having sufficient flexibility to give a "Gurley stiffness reading" below 2.8.

4. A tampon comprising a strip of absorbent material highly compressed into an oblong, cylindrical shape, a portion of said strip forming a core extending longitudinally through said tampon, another portion of said strip being helically wound around said core portion, a withdrawal string attached to said core portion, said tampon being relatively non-extensible lengthwise, said tampon having sufficient flexibility to give a "Gurley stiffness reading" below 2.8.

5. A tampon comprising a strip of absorbent material highly compressed into an oblong, cylindrical shape, said tampon having a core extending longitudinally through said tampon, a helically wound portion wound around said core portion, said core portion and said helically wound portion being attached whereby said tampon is relatively non-extensible lengthwise, said tampon having sufficient flexibility to give a "Gurley stiffness reading" below 2.8.

6. A tampon comprising a strip of absorbent material highly compressed into an oblong, cylindrical shape, said tampon having a core portion extending longitudinally through said tampon, an absorbent strip portion helically wound around said core portion, said portions being attached to each other whereby said tampon is relatively non-extensible lengthwise, said core portion having ends extending beyond the end of said tampon for withdrawing the tampon after use, said tampon having sufficient flexibility to give a "Gurley stiffness reading" below 2.8.

7. A tampon comprising a strip of absorbent material highly compressed into an oblong, cylindrical shape, said tampon having a core portion extending longitudinally through said tampon, a helically wound portion wound around said core portion, said tampon being relatively non-extensible lengthwise, said tampon ranging from about seven-sixteenths to about five-eigths of an inch in diameter, from about one and one-half to about two inches in length and weighing from about twenty grains in the lower part of said range of tampon sizes to about sixty grains in the upper part of said range, said tampon having sufficient flexibility to give a "Gurley stiffness reading" below 2.8.

8. A tampon comprising a strip of absorbent material helically wound and highly compressed into an oblong cylindrical shape, said tampon having a core portion extending longitudinally through said tampon, and a helically wound portion wound around said core portion, said tampon being relatively non-extensible lengthwise.

9. A tampon comprising a strip of absorbent material highly compressed into an oblong cylindrical shape, a portion of said strip forming a core extending longitudinally through said tampon, another portion of said strip being helically wound around said core portion, said tampon being relatively non-extensible lengthwise.

10. A tampon comprising a strip of absorbent material highly compressed into an oblong cylindrical shape, said tampon having a core portion extending longitudinally through said tampon, a helically wound portion wound around said core portion, said core portion and helically wound portion being attached, and means attached to said core portion for withdrawing the tampon after use, said tampon being relatively non-extensible lengthwise.

11. A tampon comprising a strip of absorbent material highly compressed into an oblong cylindrical shape, a portion of said strip forming a core extending longitudinally through said tampon, another portion of said strip being helically wound around said core portion, a withdrawal string attached to said core portion, said tampon being relatively nonextensible lengthwise.

References Cited in the file of this patent

UNITED STATES PATENTS

| | | |
|---|---|---|
| 271,624 | Goff | Feb. 6, 1883 |
| 2,238,450 | Rabell | Apr. 15, 1941 |
| 2,620,799 | Ganz | Dec. 9, 1952 |

FOREIGN PATENTS

| | | |
|---|---|---|
| 800,448 | France | May 4, 1936 |
| 748,247 | Great Britain | Apr. 25, 1956 |